June 21, 1938. W. M. MacPHERSON 2,121,173
VEGETATION BEARING CELLULAR STRUCTURE AND SYSTEM
Filed April 4, 1938 4 Sheets-Sheet 1

Inventor
WILLIAM M. MACPHERSON.
By E. H. Gates
Attorney

June 21, 1938.  W. M. MacPHERSON  2,121,173
VEGETATION BEARING CELLULAR STRUCTURE AND SYSTEM
Filed April 4, 1938  4 Sheets-Sheet 2

Inventor
WILLIAM M. MACPHERSON.
By E. H. Gates
Attorney

June 21, 1938. W. M. MacPHERSON 2,121,173
VEGETATION BEARING CELLULAR STRUCTURE AND SYSTEM
Filed April 4, 1938 4 Sheets-Sheet 3
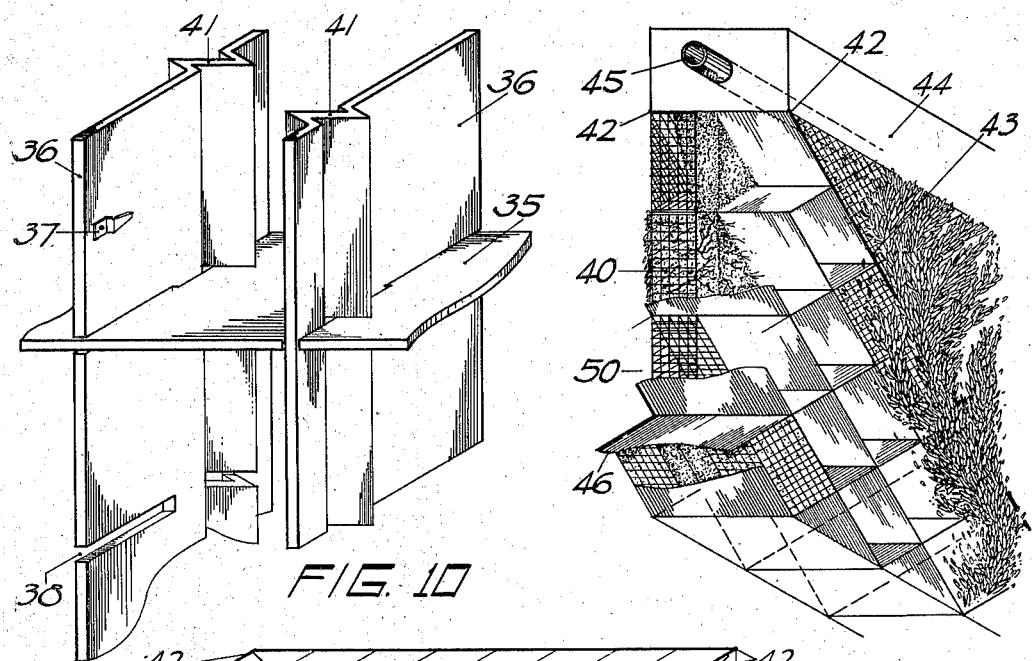
FIG. 10
FIG. 11
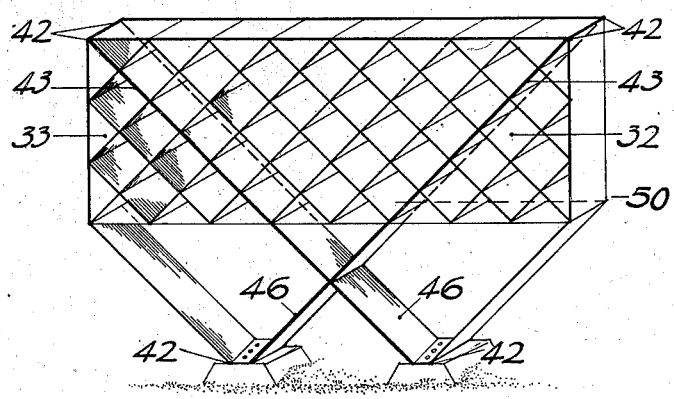
FIG. 12
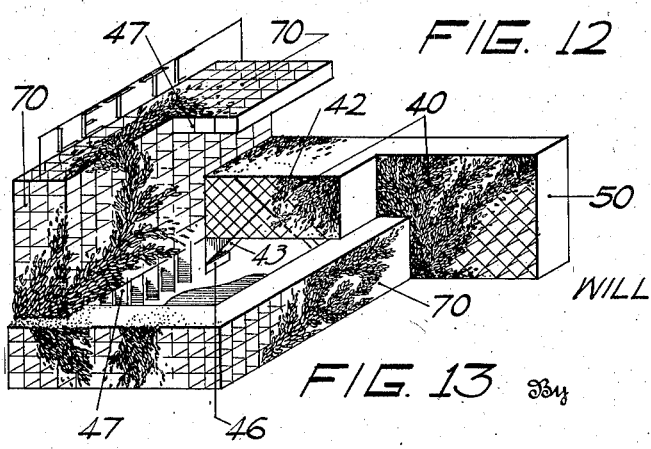
FIG. 13
Inventor
WILLIAM M. MACPHERSON
By
Attorney

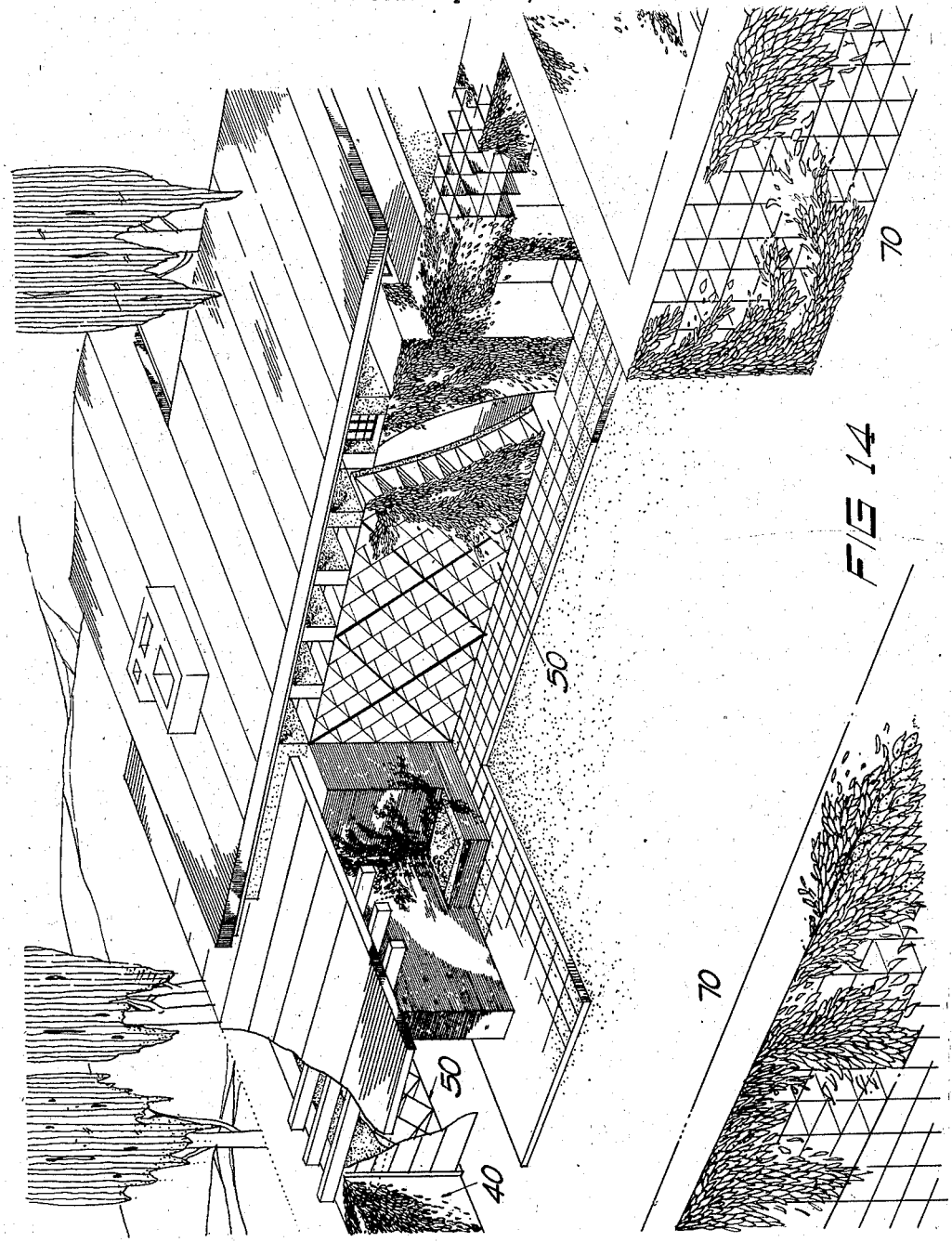

Patented June 21, 1938

2,121,173

UNITED STATES PATENT OFFICE 2,121,173

VEGETATION BEARING CELLULAR STRUCTURE AND SYSTEM

William Mathew Macpherson, Arlington, Va.

Application April 4, 1938, Serial No. 199,940

10 Claims. (Cl. 47—33)

This invention relates to vegetation bearing architectonic structures presenting plant inlay units, and further comprehends the related method of making and assembling them.

An object of this invention is to afford rigid cellular load bearing structures that may be provided with permanently growing greenery. Another object is to provide such a structure that is readily and inexpensively made, transported, assembled and reassembled. Another object is to provide such a structure that may be projected or suspended, or that may be integrated with standard load-bearing building construction. A further object is to provide such structures whose cells may detachably receive plant inlay units. An additional object is to provide a method for making these novel structures and these plant inlay units. Equally important objects will more plainly appear from the detailed specification and drawings presented herewith in exemplification but not in limitation of the present invention.

Like reference characters designate like parts in the drawings which represent diagrammatically in:—

Fig. 1, a perspective view of a reticular cover for a plant inlay unit.

Fig. 2, a perspective view of modification of the cover shown in Fig. 1.

Fig. 3, a perspective view of a portion of a propagation structure containing a plurality of the covers shown in Figs. 1 and 2.

Fig. 4, a perspective view of the cover of Fig. 1 containing its compost and vegetation, to form a completed plant-inlay unit.

Fig. 5, a perspective view of a preferred form of a rapidly assembled cellular-structure adapted to receive the plant inlay units.

Fig. 6, a perspective view of a modified form of the structure shown in Fig. 5.

Fig. 7, a perspective view of another modified form of the cellular structure shown in Fig. 5.

Fig. 8, a plan view of one of the sheet metal slotted plate or strip members used to form the hereindescribed cellular structures.

Fig. 9, a plan view of a modified form of the plate or strip member shown in Fig. 8.

Fig. 10, a perspective view of the plate member shown in Fig. 9 interfitted with an intersecting plate member such as shown in Fig. 8.

Fig. 11, a perspective view of a fragment of a vertical cross section of the structure shown in Fig. 5.

Fig. 12 shows in diagram in elevation of an upwardly projected or suspended structure of Fig. 5 in a form such as a highway advertising sign or billboard.

Fig. 13 shows a perspective view of a three-dimensional display or billboard made of the hereindescribed structures.

Fig. 14 shows a perspective view of a means of integrating the hereindescribed load bearing structures into a building and its landscaped site.

An underlying purpose of the invention is to provide a novel method and means that will readily integrate fabricated surfaces of growing greenery with an architectural structure and readily afford an effective transition between the structure and its site. This purpose and various others resulting therefrom are efficiently achieved by providing a novel fabricated cellular wall or structure whose external cells may contain inlays of permanently growing vegetation. This novel structure is fabricated with slotted plates or strips of sheet material interfitted to form a continuous integral series of contiguous cells, each of which preferably may be fitted with a light open mesh-cover holding on its inner face a plant nourishing compost provided with vegetation rooted therein and growing through the open mesh cover and carpeting its outer face. This cellular structure may embody a novel application of a triangular panel truss assembly of the interfitting plates which makes it rigidly resistant to diagonal shear. The plant inlays previously mentioned are also provided for these structures in a novel way and other advantageous features and novel embodiments of this invention will be subsequently presented herein.

Figure 1:
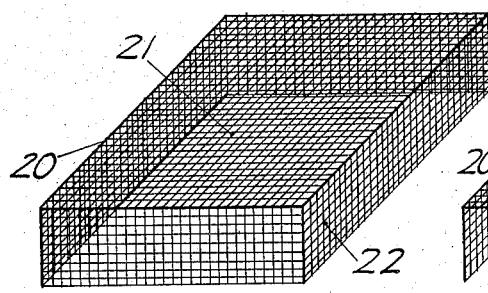
Figure 4:
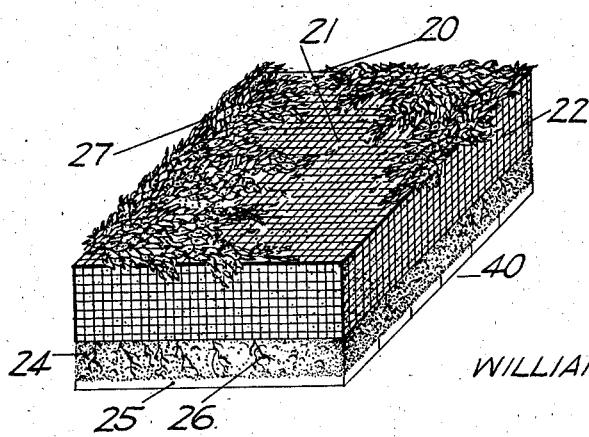

In Fig. 1 is shown a preferred form of a square cover 20 for the plant-inlay units 40 shown in Fig. 4.

Figure 2:
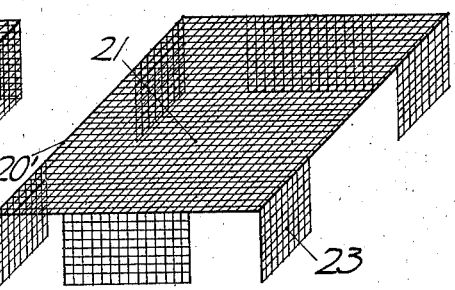

The cover 20 includes a top reticular surface 21 and flanges 22. Modified flanges are shown as tabs 23 in Fig. 2. The surfaces 21 may be formed of wire mesh or the entire cover 20 or 20' may be fabricated of rigid reticular material such as wire mesh or expanded metal lath or sheets. The covers 20 may have other shapes such as triangular as shown at 31 in Fig. 3.

Figure 3:
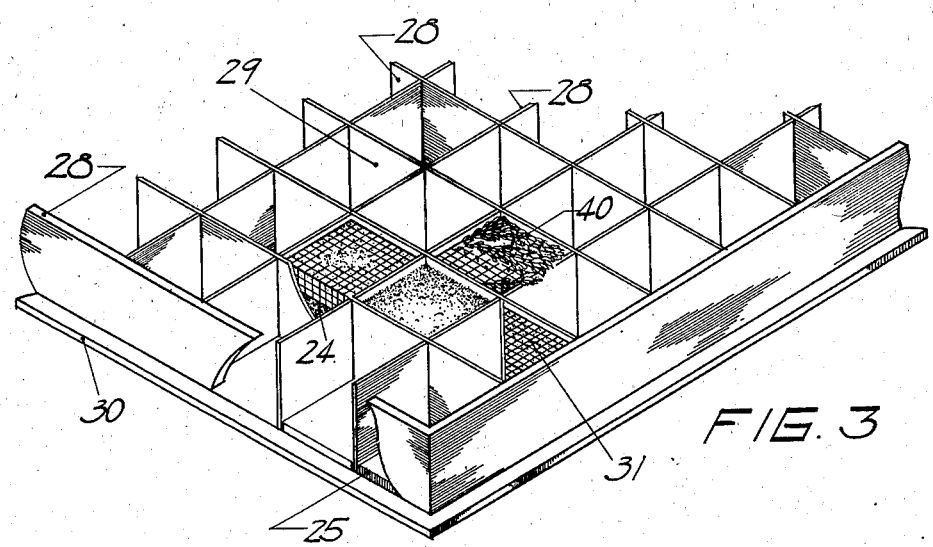

In Fig. 3 is shown a preferred means for making the plant-inlay units 40 shown in Fig. 4. In Fig. 3 the partitions 28 are interfitted to form a series of propagation compartments 29. These compartments 29 may rest on a suitable base 30, and each compartment 29 may be fitted with a removable sill 25. These compartments 29 may then be filled over the sills 25, with a plant nourishing and conditioning compost 24 thoroughly seeded or provided with cultures or spores at the upper surface thereof in each of the thus-filled compartments 29. Subsequently, the covers 20 or 20' are inserted and fitted into each compartment 29 with the flanges 22 or tabs 23 downwardly disposed so that the top of the covers 20 or 20' contact the seeded surface of the compost 24 in the compartments 29. When the seeds or the like have formed a root mass 26 in the compost 24 and the resulting vegetation 27 has grown through and covered the reticular surface 21 a plant inlay-unit 40 as shown in Fig. 4 has been formed and it may be readily removed from the compartment 29 by means of the removable sill 25.

The compartments 29 in Fig. 3 may be divided by a diagonal partition so as to form triangular inlay-units 31. The plant inlay units 40 and 31 are now ready to be fitted into the cells 32, 33, or 34 of the structures next described.

Fig. 4 shows the completed plant inlay-unit 40 before it is removed from its propagation sill 25, on which it may be shipped. When the unit 40 is rectangular as shown in Fig. 4, it may be fitted into a cell such as 32; when it is triangular as shown at 31 in Fig. 3, it may be fitted into a cell such as 33. When the unit 40 comprises a cover 20' with the tabs 23 it may be fitted into a divided cell such as is shown at 34 in Fig. 6, so that the tabs 23 may fit into the cell 34 on each side of the plate member 43 that divides the cells such as are shown at 34.

Figure 5:
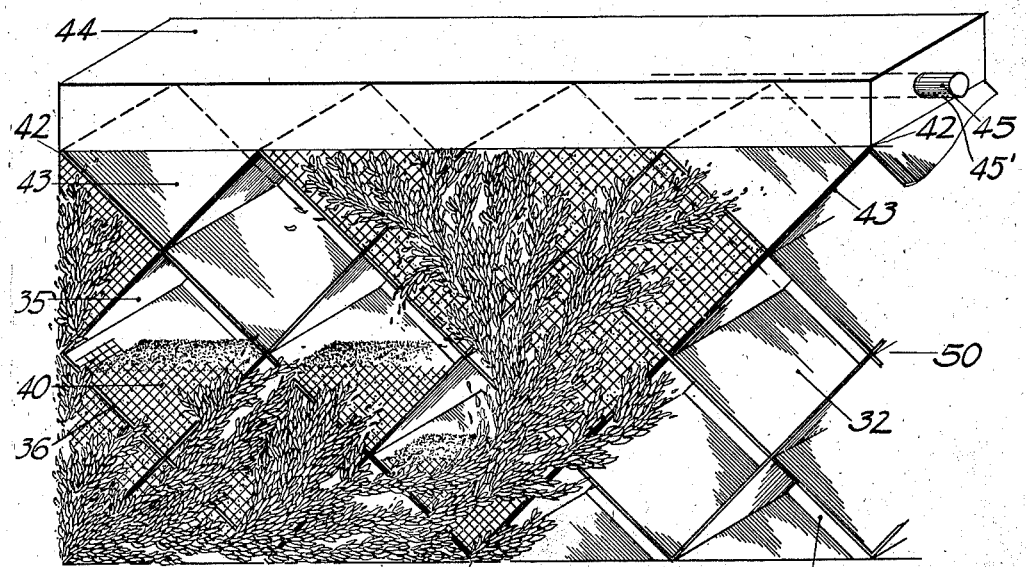
Figures 6, 7, 8, 9:
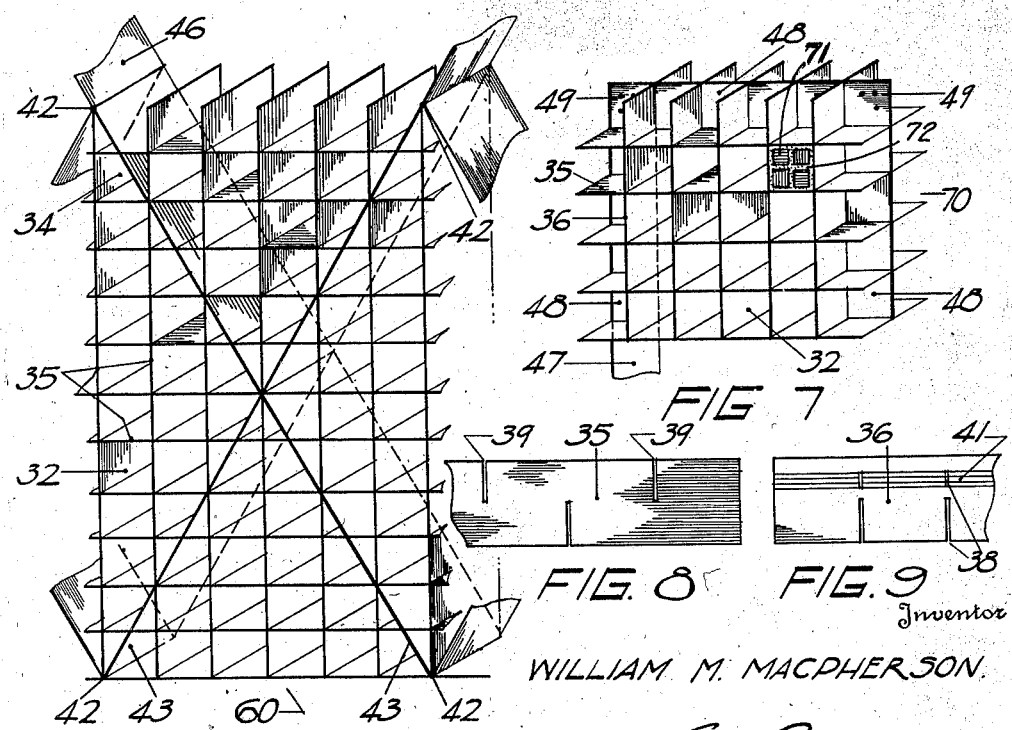

Fig. 5 shows a preferred form of a demountable load bearing cellular structure 50, adapted to receive inlay units 40 and 31 shown in Figs. 4 and 3. The structure 50 is formed of slotted interfitting and intersecting plate members 35 or 36 or combinations thereof such as are shown in Figs. 8 and 9. It is preferably assembled by detachably fixing (by any known means such as bolting) plates 35 or 36 at their extremities as at the three points 42 forming a triangular panel truss and the plates 35 or 36 thus fixed become the truss members 43. Additional slotted plates 35 or 36 may be removably interfitted (preferably in a series of half lap joints as are well known in the formation of compartmented receptacles) with the truss members 43 to form the complete series of cells 32 and 33 in the structure 50. The cells thus formed may be termed a series of tegular cells. A bottomless coping member 44 supported by the rigid load bearing structure 50 may embody irrigating and plant nourishing means 45 in the form of a perforated pipe having perforations shown at 45' in Figure 5 or moisture reservoir which may be used for the introduction of water and nutrients into the structure 50. Instead of the diagonal plates 35 and 36 shown in Fig. 5, horizontal and vertical slotted plates 35 may be assembled into the structure 60 shown in Fig. 6 to form the undivided cells 32 together with double triangular panel truss plates 43 fixed therein at the triangle points 42 which also forms the divided cells 34. Any of the plate members of the structures 50 and 60, and 70, may be extended as shown at 46 in Fig. 6 and at 47 in Fig. 7 so that these extensions 46 and 47, which may be vertical or horizontal may be readily integrated with buildings or other load bearing or landscaping structures as shown in Figs. 13 and 14. The structure 60 is particularly adaptable where unusual altitude is required.

The structures 50, 60, and 70 may be fully demountable as the slotted plates 35 and 36 may be readily disengaged and piled flat for shipping. The structures 50, 60, and 70, may also be assembled into flat cellular structures of readily transportable dimensions, and placed on the base 30, and thus replace the propagation compartments 29. The inlay units 40 may then be provided with growing vegetation while they are inserted in the cells 32, 33 or 34, and the entire structures 50, 60, or 70 fitted with units 40, thus propagated, may be shipped on the base 30 to the desired site as completed members or sections of members, already provided with vegetation.

Fig. 7 shows a preferred form of a cellular structure 70 that is particularly adapted to be assembled to form portions of load bearing members in the form of integral groups of cells. The structure 70 may be assembled entirely of vertical and horizontal plates 35 or 36 or combinations thereof. This assembly may be formed into a rigid compound or integral group of cells 32 by periphery plates 48 provided with slots engaging the projecting ends of the plates 35 and 36 and interfitted therewith around the periphery of the structure 70. The plates 48 may be fixed at the corners of the structure 70 as shown at 49 in Fig. 7.

Fig. 8 shows a plate or strip member 35 having slots positioned therein as shown at 39. The plates or strips 35 are preferably made of light sheet steel plates, and are particularly adapted for use in structures such as 60 in Fig. 6.

Fig. 9 shows a modified plate or strip 36 having slots positioned therein as shown at 38. The plates 36 are provided with a longitudinal groove or channel 41 which adds stiffness to plate 36 and to the cells 32 and 33 formed thereby. The groove 41 also acts as an irrigation channel for the cells 32 and 33.

Fig. 10 shows a perspective view of a detail of the plates 35 and 36, shown in Figs. 8 and 9, at their interfitted intersections as they may be embodied in the structures 50 and 70. The plates 36 shown in Fig. 9 are slotted as shown at 38 through the projecting portion of the groove or longitudinal corrugation 41 and through a portion of the plate 36 as also shown at 38. The corrugation 41 functions to add rigidity to the plates 36 and to the cells 32. It also acts to position and support the inlay units 40 and further serves as irrigating channels thereto. Additional engaging means for detachably holding the inlay units 40 in the cells 32, 33 and 34 may be provided in the form of a spring projection or tongue such as is shown at 37 in Fig. 10.

Fig. 11 shows in perspective a fragment of a vertical cross-section of the structure 50 shown in Fig. 5 wherein both faces of a wall structure may be provided with inlay units such as shown at 40 in Fig. 4 and at 31 in Fig. 3. Double-faced walls may be formed in a like manner with the structures 60 and 70 shown in Figs. 6 and 7. In Fig. 11 the truss member 43 is shown fixed at the triangle point 42 in the structure 50 supporting the coping 44 and the irrigating means 45. The extension plate is shown at 46, the inlay unit at 40 and the triangular inlay unit at 31.

Fig. 12 shows in perspective a diagram of a modified form of the structure 50 that may be suspended or projected upwardly or outwardly as may be shown by the extensions 46 of the truss plates 43 shown, which are fixed at the triangle points 42 as shown in Fig. 12. The cells 32 and 33 may be combined in a lettered design of inlay units 40 and 31, to form a billboard in greenery for highway advertising or the like.

Fig. 13 shows a perspective view of an assembly of the hereindescribed structures 50 and 70 in the form of a three dimensional decorative display or billboard, wherein the herein-described structures are integrated and used both as horizontal and vertical members. The structures with their inlay units such as 40 are integrated by means of the extensions 46 of the truss plate 43 fixed at the triangle points 42, and by the extensions 47 of the plates 35 and 36. The assembly shown in Fig. 13 may also be provided with irrigation pipes or moisture reservoirs such as are illustrated at 45 in Figs. 5 and 11.

Fig. 14 shows an aerial perspective view of a landscaped site and building that may combine various embodiments 40, 50, 60 and 70 of the present invention both as beautifying means and integrated load bearing structural means. It displays the novel and effective methods and means for architectonically unifying the site with the building and immediately provides growing greenery surfaces, forms, and space enclosures, that enable architects and planners of housing projects to immediately beautify any given area and create the type of landscaping that is immediately complementary to the proposed housing project.

In the embodiment of the hereindescribed structures such as 50, 60 and 70 in a gradual integration as shown in Fig. 14 they act not only as load bearing structures but also replace prior structural members at various points therein. In addition the structures 50 and 60 also eliminate diagonal shear in wall members due to the incorporation of the triangular panel truss 43 previously hereindescribed, and are therefore particularly resistant to major shock such as earthquake disturbances.

The building shown in Fig. 14 may be multiple-storied and the structures such as 50, 60 and 70 would readily function as load bearing members therein.

The double-faced wall shown in Fig. 11 may contain on its inner face waterproofing or inlays of moisture resisting material to prevent the transfer of moisture from an exterior wall to an interior room. The cellular structures 50, 60 and 70 also act to prevent the accumulation of shrinkage in the compost 20 in the unit 40. The rigidity of the cells 32 is further increased by the slotted portion of the corrugation 41 shown in Fig. 10 which enables the corrugation 41 to support the slotted portion of the plate 35.

In operation the plates such as 35 and 36 may be completely pre-fabricated and may be compactly shipped unassembled to the site or to the plant propagation area as desired. They then may be assembled into the various structures 50, 60, and 70, or sections thereof may be supplied with inlays either inserted or grown therein. In the structures 50 and 60 the diagonal slotted truss plates 43 may first be positioned and fixed or jointed at the triangle points 42, and subsequently the slotted plates 35 or 36 may be removably interfitted as shown in Figs. 5 and 6. In assembling the structure 70 the slotted horizontal plates 35 and the vertical plates 36 are removably interfitted as shown in Fig. 7. Subsequently the periphery plates 48 which are slotted as shown at 39 in Fig. 9 (but which do not contain the corrugation 41) are interfitted in a half lap joint with the projecting ends of the plates 35, and 36 as shown in Fig. 7. The novel structures 50, 60 and 70 have a peculiar and inherent ability to uniformly distribute the effect of the various loads arising in building construction and when these structures embody the fixed triangular truss plates 43 they not only offer an increased load bearing and load effect distributing quality but also become amazingly resistant to diagonal shear even when built of relatively low gauge sheet steel plates or strips as they produce a maximum of stiffness with a minimum amount of material. These structures are now ready to receive the plant inlay units 40 and 31 which are tightly fitted into the cells such as 32, 33 and 34 so that the flanges 22 or the tabs 23 will removably engage the sides of the cells and the retaining means 37 and 41 as described herein. The slots 38 and 39 and the groove 41 and the irrigation means 45 act together to supply moisture and nutrients to the various cells and plant inlays.

Other relatively fragile inlays such as glass bricks such as are indicated at 71 in Figure 7, may be used effectively either alone or preferably adjacent to the plant inlays and may be removably or rigidly held in position in the cells such as 32 and 33, either with or without mastic as indicated at 72 in Figure 7 usually required for the installation of glass bricks, and the like.

A wide variety of vegetation is available for use in the plant inlays. Those partciularly desirable comprise many varieties of rock plants that may be readily grown in conditions of reduced sunlight and moisture. The compost can be readily selected to best serve the condition of use for many varieties well known in the industry. Thus, the soil substitute or compost may be made with any of the mineral fibers used for insulating purposes or any other suitable substance of low specific gravity such as aerated or puffed micaceous material such as vermiculite, all of which may take the place of the relatively inert mineral portion of natural earth. To this compost may be added humus of any standard or modified form with the chemical nutrients required for plant growth. In addition there may be mixed with or injected into the compost any of the conditioners of organic growth either chemical (inorganic or organic), bacteriological, symbiotic, enzymatic, hormonic.

The reticular material used to form the inlay covers 20 is preferably formed of a corrosion resisting open wire mesh fabric or sheet material. Other forms of reticulated material may be expanded metal lath or sheets, openly perforated sheeting of various materials and similar reticular materials. In conditions where interchangeability of the inlay units is not required the particular material used for the inlay cover need not be corrosion resisting and need not have any large degree of rigidity. Therefore, in such cases the covers 20 or 20' may be made from any coarse open fabric or openly perforated sheet material. The structure is preferably formed of relatively low gauge steel plates or sheets, but in small units such as shown in Fig. 7 the plates may be of rigid plastic, composition material, or thin gauge metal sheeting.

Skilled workers in the art are aware of prior art disclosures of walls built as masonry construction of various types of vegetation bearing blocks, and are also aware of prior walls of equally well known construction into which are built removable flower pots or flower containers of pottery or other materials, but none of the prior disclosures have ever suggested the dual function performed by the present invention, namely, an integral cellular load bearing plant surface that needs no supporting framework, and that needs no vegetation bearing blocks or structural unit containers to build its greenery surface. The fixed cells are both the wall and the containers in the present invention, which has described herein a novel plant inlay and method for making and embodying it in a novel plant structure.

It is thus apparent that the present invention does not require the assembly or incorporation of any removable or nonremovable plant container that is a structural unit or that replaces a masonry structural unit.

The fixed cells such as 32, 33 and 34 in the present invention perform the combined function of structural unit and container for the plant-compost. The vegetation-bearing surface inlays herein described are relatively fragile or yieldable and, therefore, entirely distinct from structural units, and are not intended to be regarded as structural units herein.

In the specification and claims the following terms used therein are intended to be defined as follows:

Architectonic: pertaining to the art of landscaping structure as well as to buildings, but distinguished from the art of plant culture.

Compound: a structural assembly of a plurality of structural units.

Reticular material: meshed or perforated sheet material, expanded metal lath or sheets, wire fabric sheets.

While the foregoing specification and drawings set forth the preferred exemplifications of the present invention it is intended to include all variations and modifications within the spirit and scope of the appended claims:

1. The method of providing vegetation-bearing structural surfaces that includes the steps of erecting a rigid integrated series of contiguous exposed tegular cells fabricated of sheet material, and removably fitting said cells with vegetation-supporting inlays provided with growing vegetation.

2. The method of providing vegetation-bearing structural surfaces that includes the steps of erecting a series of interfitting and intersecting strips of sheet material to form thereby a rigid integral cellular structure presenting a series of contiguous exposed cells, and removably fitting said cells with vegetation-supporting inlays provided with growing vegetation.

3. The method of providing vegetation-bearing structural surfaces that includes the steps of providing a plurality of propagation compartments with compost, covering said compost in said compartments with reticular covers, providing vegetation rooted in said compost and growing through and carpeting said covers, removing said rooted composts together with their covers and vegetation in the form of individual plant-inlays, erecting an integrated series of contiguous exposed cells fabricated of corrosion-resisting sheet material, and fitting said inlays into said cells, so that they may be capable of presenting an unbroken surface of vegetation over the exterior of said structural surface.

4. The method of making an architectural compound provided with vegetation-bearing surfaces that includes the steps of fabricating on a horizontal surface a rigid integral cellular structure of corrosion-resisting sheet material presenting a series of contiguous exposed cells, providing said cells with compost, covering said compost in said cells with a removable reticular cover in each of said cells, providing vegetation rooted in said compost and growing through and carpeting said cover, removing said structure from said horizontal surface, and erecting and integrating said structure into said compound.

5. The method of making a load-bearing and shear-resisting architectural compound provided with vegetation-bearing surfaces that includes the steps of erecting a series of corrosion-resisting slotted panel-truss plates, fixing said truss plates at triangle points, removably interfitting in half lap joints a series of slotted intersecting cross plates to form thereby a rigid integral cellular structure presenting a series of contiguous exposed cells, and removably fitting said cells with vegetation supporting inlays provided with growing vegetation.

6. A vegetation-bearing cellular structure comprising in combination a rigid, integral series of contiguous exposed cells erected in tegular arrangement and fabricated of corrosion-resisting sheet material, and vegetation supporting plant inlays fitted into said cells.

7. A vegetation-bearing cellular structure comprising in combination a series of interfitting and intersecting strips of corrosion-resisting sheet material erected to form thereby a rigid integral cellular structure presenting a series of contiguous exposed cells, and vegetation supporting plant inlays fitted into said cells.

8. The structure of claim 7 wherein the strips embody irrigating means, comprising medial longitudinal grooves.

9. The structure of claim 7 wherein the strips embody combined inlay-supporting and irrigating means, comprising medial longitudinal grooves.

10. A load-bearing and shear-resisting structure provided with vegetation-bearing surfaces comprising in combination an erected series of corrosion-resisting slotted panel-truss plates fixed at triangle points, a series of intersecting cross plates removably interfitted in half lap joints with said truss plates to form thereby a rigid integral cellular structure presenting a series of contiguous exposed cells, and vegetation supporting plant inlays fitted into said cells.

WILLIAM MATHEW MACPHERSON.